United States Patent
Lee et al.

(10) Patent No.: US 11,179,996 B2
(45) Date of Patent: Nov. 23, 2021

(54) FOUR-WAY VALVE

(71) Applicant: LG ELECTRONICS INC., Seoul (KR)

(72) Inventors: Jooseong Lee, Seoul (KR); Inho Choi, Seoul (KR); Kyunghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 7 days.

(21) Appl. No.: 16/796,374

(22) Filed: Feb. 20, 2020

(65) Prior Publication Data

US 2020/0317022 A1     Oct. 8, 2020

(30) Foreign Application Priority Data

Apr. 4, 2019  (KR) .......................... 10-2019-0039732

(51) Int. Cl.
| | |
|---|---|
| *B60H 1/00* | (2006.01) |
| *F16K 11/074* | (2006.01) |
| *F16K 31/04* | (2006.01) |

(52) U.S. Cl.
CPC ........ *B60H 1/00485* (2013.01); *F16K 11/074* (2013.01); *F16K 31/041* (2013.01); *B60H 2001/00935* (2013.01)

(58) Field of Classification Search
CPC .......................... B60H 1/00485; F16K 11/074
See application file for complete search history.

(56) References Cited

U.S. PATENT DOCUMENTS

| | | | | |
|---|---|---|---|---|
| 4,203,469 A | * | 5/1980 | Gates | ................... F16K 11/074 |
| | | | | 137/625.43 |
| 4,255,939 A | | 3/1981 | Ou | |
| 4,311,020 A | | 1/1982 | Tobin et al. | |
| 5,462,085 A | * | 10/1995 | Iwata | ................... F16K 11/052 |
| | | | | 137/625.43 |

(Continued)

FOREIGN PATENT DOCUMENTS

| | | |
|---|---|---|
| EP | 2182260 A1 | 5/2010 |
| EP | 2290273 A2 | 3/2011 |

(Continued)

OTHER PUBLICATIONS

Office Action of Korean Patent Office in Appl'n. No. 10-2019-0039732, dated May 11, 2020.

*Primary Examiner* — Kevin R Barss
(74) *Attorney, Agent, or Firm* — Dentons US LLP (57) ABSTRACT

Disclosed is a four-way valve including a housing having a refrigerant filling chamber formed therein, a high pressure pipe hole formed on a bottom surface of the housing and coupled to a high pressure pipe through which refrigerant discharged from the compressor flows, a first pipe hole formed on an upper surface of the housing and coupled to a first pipe extending to a first heat exchanger, a second pipe hole formed on the upper surface of the housing and coupled to a second pipe extending to a second heat exchanger, a low pressure pipe hole formed on the upper surface of the housing and configured to allow the refrigerant to be collected to the compressor, and a switching guide configured to rotate to allow the low pressure pipe hole to selectively communicate with the first pipe hole or the second pipe hole.

19 Claims, 5 Drawing Sheets

(56) References Cited

U.S. PATENT DOCUMENTS

| | | | | |
|---|---|---|---|---|
| 7,895,850 | B2* | 3/2011 | Kitsch | F25B 47/006 |
| | | | | 62/176.6 |
| 8,327,883 | B2 | 12/2012 | Kannoo | |
| 8,397,757 | B2 | 3/2013 | Kannoo et al. | |
| 9,680,190 | B1* | 6/2017 | Xia | H01M 10/615 |
| 2012/0024398 | A1 | 2/2012 | Kannoo | |
| 2016/0075214 | A1* | 3/2016 | Hamamoto | B60H 1/00921 |
| | | | | 62/160 |
| 2016/0209092 | A1* | 7/2016 | Kuroda | F25B 41/20 |
| 2017/0028813 | A1* | 2/2017 | Enomoto | B60H 1/24 |
| 2018/0283565 | A1* | 10/2018 | Tanaka | F25B 41/31 |
| 2018/0328635 | A1* | 11/2018 | Tashiro | F25B 47/02 |

FOREIGN PATENT DOCUMENTS

| | | |
|---|---|---|
| JP | 10-9416 A | 1/1998 |
| JP | 2012-026525 A | 2/2012 |
| KR | 10-2002-0045041 A | 6/2002 |
| KR | 10-2016-0133028 A | 11/2016 |
| KR | 10-2018-0039861 A | 4/2018 |
| KR | 10-2018-0088211 A | 8/2018 |

* cited by examiner

FOUR-WAY VALVE

CROSS-REFERENCE TO RELATED APPLICATIONS

The present application claims priority under 35 U.S.C. 119 and 35 U.S.C. 365 to Korean Patent Application No. 10-2019-0039732, filed in Korea on Apr. 4, 2019, which is hereby incorporated by reference in its entirety.

BACKGROUND

Field of the Invention

The present disclosure relates to a four-way valve and, more particularly, to a four-way valve for switching a refrigerant flow path.

Discussion of the Related Art

In general, a heating and cooling device for cooling or heating using a phase change of a refrigerant includes an indoor unit having an indoor heat exchanger and an outdoor unit having an outdoor heat exchanger.

During cooling, the refrigerant discharged from the compressor is supplied to an outdoor heat exchanger that performs a function of a condenser, and then heat-exchanged, while passing through an indoor heat exchanger that performs a function of an evaporator to cool a room (or indoor area). In addition, during heating, the refrigerant discharged from the compressor may be heat-exchanged, while passing through the indoor heat exchanger that performs the function of the condenser to heat the room.

Here, whether to allow the high temperature and high pressure refrigerant discharged from the compressor to flow to the indoor heat exchanger or the outdoor heat exchanger is determined by a switching operation of the four-way valve.

In general, the four-way valve includes a body having a refrigerant filling chamber filled with the refrigerant. The main body may include a switching unit for switching a flow path such that the high temperature and high pressure refrigerant discharged from the compressor is provided to one of the first heat exchanger and the second heat exchanger.

In addition, the switching unit is provided to be moved according to the cooling operation or heating operation in the interior of the main body.

Meanwhile, in recent years, development of an electric vehicle that uses electric power as a power source to replace a car using oil as a power source causing pollution. The electric vehicle is provided with a heat pump system as an air conditioner. The heat pump system includes the configuration of the heating and cooling device.

In addition, the electric vehicle may have an engine room having a limited volume in which a battery and a driving device for generating power using electric power supplied from the battery are provided.

In the engine room of the electric vehicle, a plurality of devices are installed with high density. In particular, a power train may be disposed at the center of the engine room. Therefore, a space in a widthwise direction of the engine room is relatively much narrower than a space in a height-wise direction.

For this reason, miniaturization of the devices installed in the engine room is a very important objective and technical problem in a technical field of the electric vehicle. However, the four-way valve according to the related art has a relatively large size, which is inappropriate to be installed in the engine room having the limited volume.

In particular, the four-way valve according to the related art has a large diameter. Specifically, the four-way valve according to the related art has a problem in that four ports for guiding a flow of the refrigerant are all formed on the same surface, thus having a relatively large diameter.

In addition, according to the four ports positioned on one surface, flow paths through which a high pressure refrigerant and a low pressure refrigerant flow are relatively close to each other. This causes a problem in that heat loss occurs due to heat transfer between the high temperature and high pressure refrigerant and the low temperature and low pressure refrigerant.

In addition, since the four-way valve according to the related art provides a flow path of the 'U' shape in which a flow direction from an inflow of the refrigerant to an outflow of the refrigerant is changed by 180 degrees, a turbulence intensity is relatively large, making a large flow loss. In addition, the 'U'-shaped flow path further accelerates heat transfer between the high temperature and the low temperature refrigerants.

Related art document information is as follows.

(Patent Document 1) KR10-2018-0088211 A, entitled Four-way valve for switching refrigerant flow path (Patent Document 2) KR10-2016-0133028 A, entitled Heat pump system for vehicle

SUMMARY

An aspect of the present disclosure is directed to providing a four-way valve that may solve the above problems.

Another aspect of the present disclosure is directed to miniaturizing a four-way valve or forming a compact four-way valve provided in an electric vehicle.

Another aspect of the present disclosure is directed to providing a four-way valve that may minimize pressure drop of a refrigerant.

Another aspect of the present disclosure is directed to providing a four-way valve that may reduce heat transfer between refrigerants passing through the four-way valve.

To achieve these and other advantages and in accordance with the purpose of the disclosure, as embodied and broadly described herein, there is provided a four-way valve in which an inlet into which a high pressure fluid flows may be positioned on the opposite side of an outlet from which the high pressure fluid is discharged. Thus, the high pressure fluid may flow along a relatively straight flow path.

That is, in the four-way, the inlet into which a gas discharged from the compressor flows is positioned in the opposite direction of the other three inlet and outlets. Here, the other three inlet and outlets may be defined as an inlet and an outlet of the low pressure refrigerant and the outlet of the high pressure refrigerant.

In other words, the four-way valve may be formed to maintain the same inflow direction of the refrigerant to the outlet.

Specifically, a four-way valve according to an embodiment of the present disclosure includes: a housing having a refrigerant filling chamber formed therein, a high pressure pipe hole formed on a bottom surface of the housing and coupled to a high pressure pipe through which refrigerant discharged from the compressor flows, a first pipe hole formed on an upper surface of the housing and coupled to a first pipe extending to a first heat exchanger, a second pipe hole formed on the upper surface of the housing and coupled to a second pipe extending to a second heat exchanger, a low pressure pipe hole formed on the upper surface of the housing and configured to allow the refrigerant to be collected to the compressor, and a switching guide configured to rotate to allow the low pressure pipe hole to selectively communicate with the first pipe hole or the second pipe hole.

In addition, the first pipe hole, the second pipe hole, and the low pressure pipe hole may communicate with the refrigerant filling chamber.

In addition, an upper surface of the switching guide may be configured to be opened to cover a lower end of the low pressure pipe hole and a lower end of the first discharge hole or the second discharge hole.

In addition, the housing may include: a first housing, a second housing extending downward from a lower end of the first housing, and a motor housing coupled to the outside of the second housing.

In addition, the high pressure pipe hole may be configured to open a bottom surface of the second housing in a vertical direction.

In addition, the first pipe hole, the second pipe hole, and the low pressure pipe hole may be configured to open the first housing in the vertical direction.

In addition, the second housing may include a partition plate bent inward to partition the motor housing and the refrigerant filling chamber.

In addition, the motor housing includes a motor and a motor shaft for transmitting power from the motor, and the motor shaft may extend upward through the partition plate.

In addition, the switching guide may include a shaft coupling portion to which the motor shaft is coupled.

In addition, the motor shaft and the shaft coupling portion may be coupled on a central axis line of the low pressure pipe hole.

In addition, the first pipe hole, the second pipe hole, and the low pressure pipe hole may be arranged to form a triangle.

In addition, the switching guide may rotate in a clockwise or counterclockwise direction based on the low pressure pipe hole.

In another aspect of the present disclosure, a four-way valve according to an embodiment of the present disclosure may be installed as a component of an electric vehicle.

That is, the electric vehicle includes a battery and an air conditioner using the battery as a driving source, the battery and the air conditioner being installed in an engine room, wherein the air conditioner includes: a compressor, a first heat exchanger, an indoor duct including a second heat exchanger, a PTC heater, and a blow fan, and the four-way valve described above.

According to the present disclosure, since the flow path of the relatively high-pressure refrigerant, unlike the refrigerant flow path of the related art, is formed, there is no change in the flow direction, thereby further reducing a turbulence intensity. Accordingly, flow loss of the refrigerant may be reduced.

In addition, since the four-way valve is formed to maintain the same inflow direction of the refrigerant up to the outlet, pressure drop that occurs during the flow may be minimized.

Further, in addition to the reduction in turbulence intensity described above, the distance between the flow path of the high pressure refrigerant and the flow path of the low pressure refrigerant is also relatively increased, thereby further reducing heat transfer between each other.

In addition, since the length (or diameter) of the four-way valve in the widthwise direction is relatively short, the four-way valve may be miniaturized or compact. Accordingly, the four-way valve may be appropriately installed in a narrow engine room of an electric vehicle.

In addition, since the shaft of the motor is coupled to the switching guide so as to match a central axis of the low pressure pipe hole, the motor rotates in both directions based on the low pressure pipe hole, thereby minimizing a rotation angle. Accordingly, the motor provided in the four-way valve may be provided as a relatively low output motor, and thus, the size of the motor may be minimized.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Reference will now be made in detail to the exemplary embodiments of the present disclosure, examples of which are illustrated in the accompanying drawings. Wherever possible, the same reference numbers will be used throughout the drawings to refer to the same or like parts.

Reference will now be made in detail to the embodiments of the present disclosure, examples of which are illustrated in the accompanying drawings.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense.

Also, in the description of embodiments, terms such as first, second, A, B, (a), (b) or the like may be used herein when describing components of the present disclosure. Each of these terminologies is not used to define an essence, order or sequence of a corresponding component but used merely to distinguish the corresponding component from other component(s).

Figure 1:
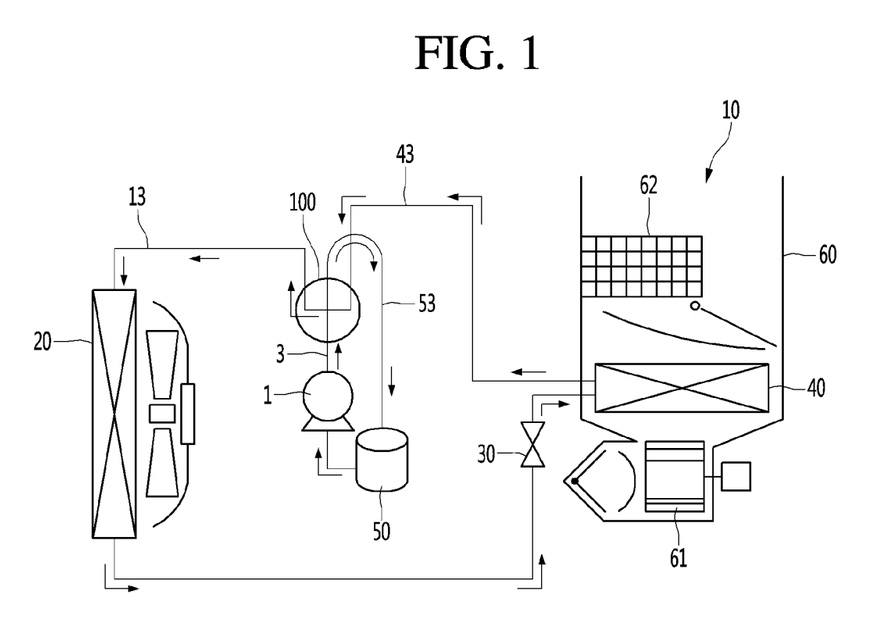
FIG. 1 is a view illustrating a flow of a refrigerant during cooling.

FIG. 1 shows a flow of a refrigerant during cooling.

Referring to FIG. 1, an electric vehicle in which a four-way valve 100 according to an embodiment of the present disclosure is installed may include a heating, ventilating and air conditioning (HVAC) module 10 and a battery (not shown).

The HVAC module 10 may also be referred to as an "air conditioner."

The HVAC module 10 may use the battery as a driving source. The electric vehicle may further include a motor, and a compressor 1 may be operated by the motor.

The HVAC module 10 may include a second heat exchanger 40, an indoor duct 60 including a PTC heater 62 and a blow fan 61, the compressor 1, a first heat exchanger 20, an expansion valve 30, and an accumulator 50.

Of course, the expansion valve 30 may be provided in the indoor duct 60.

A four-way valve 100 according to an embodiment of the present disclosure may be connected to refrigerant pipes 3, 13, 43, and 53 to change a flow path of a refrigerant implementing a refrigeration cycle.

The refrigerant pipes 3, 13, 43, and 53 may include a high pressure pipe 3, a low pressure pipe 53, a first pipe 13, and a second pipe 43.

Specifically, the compressor 1 and the four-way valve 100 are connected by the high pressure pipe 3. The first heat exchanger 20 and the four-way valve 100 are connected by the first pipe 13. The second heat exchanger 40 and the four-way valve 100 are connected by the second pipe 43. The accumulator 50 and the four-way valve 100 are connected by the low pressure pipe 53.

Hereinafter, a refrigerant flow at the time of cooling in the vehicle using the four-way valve 100 according to an embodiment of the present disclosure will be described briefly.

First, during cooling (see the arrows), a high temperature and high pressure refrigerant (hereinafter, "high pressure refrigerant") discharged from the compressor 1 may be supplied to the first heat exchanger 20 provided outside the vehicle by the four-way valve 100 20. The high pressure refrigerant may be condensed in the first heat exchanger 20.

The refrigerant condensed by the first heat exchanger 20 may be expanded by the expansion valve 30 and subsequently supplied to the second heat exchanger 40 provided in the indoor duct 60. The expanded refrigerant may be evaporated in the second heat exchanger 40.

That is, the refrigerant supplied to the second heat exchanger 40 may be heat-exchanged with indoor air flowing into the indoor duct 60 to cool an indoor area (or room). The low temperature and low pressure refrigerant (hereinafter, "low pressure refrigerant") may flow into the four-way valve 100 and be collected to the accumulator 50. In addition, the refrigerant passing through the accumulator 50 may flow into the compressor 1 and circulate.

Meanwhile, during heating, the high pressure refrigerant discharged from the compressor 1 may be supplied to the second heat exchanger 40 provided in the indoor duct 60 by the four-way valve 100. That is, during heating, the second heat exchanger 40 may perform a condenser function and the first heat exchanger 20 may perform an evaporator function.

As described above, the four-way valve 100 may guide the refrigerant discharged from the compressor 1 to the first heat exchanger 20 or the second heat exchanger 40 according to the cooling or heating operation.

Specifically, the high pressure refrigerant discharged from the compressor 1 may be supplied to the inside of the four-way valve 100 and then flow to one of the first pipe 13 and the second pipe 43 according to selective rotation of the switching guide 140 (to be described later).

The refrigerant supplied to the first heat exchanger 20 or the second heat exchanger 40, after completing a predetermined function of the refrigerant, becomes a low pressure refrigerant, and then recovered into the four-way valve 100. The recovered low pressure refrigerant may flow to the low pressure pipe 53. That is, the low pressure pipe 53 may be understood as a refrigerant pipe provided to recover the refrigerant circulating through the cycle to the compressor 1.

Figure 2:
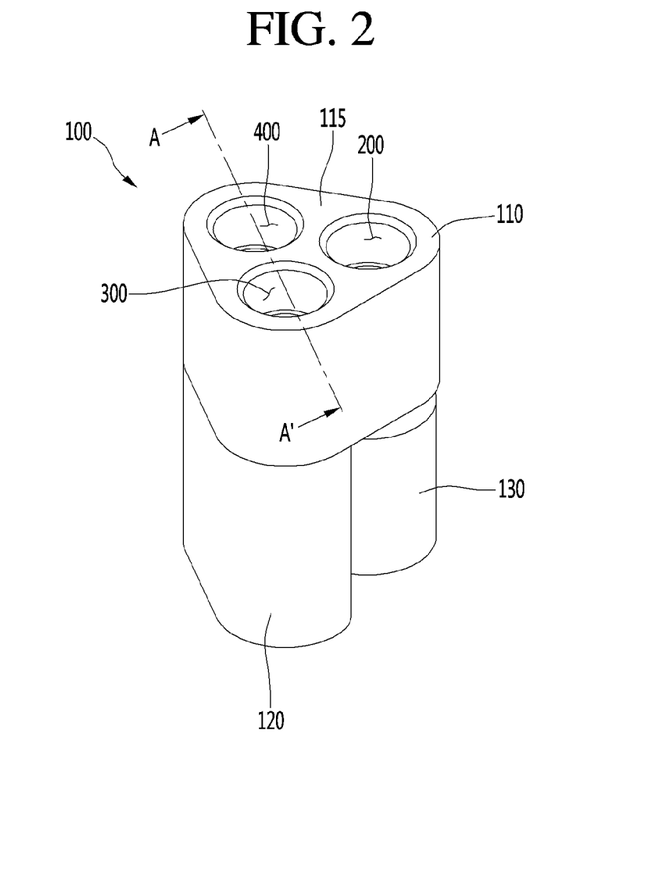
FIG. 2 is a top perspective view of A four-way valve according to an embodiment of the present disclosure.
Figure 3:
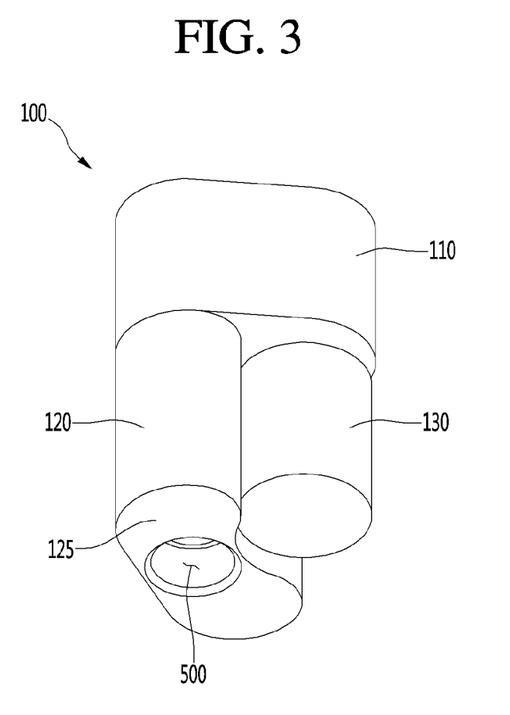
FIG. 3 is a bottom perspective view of a four-way valve according to an embodiment of the present disclosure.
Figure 4:
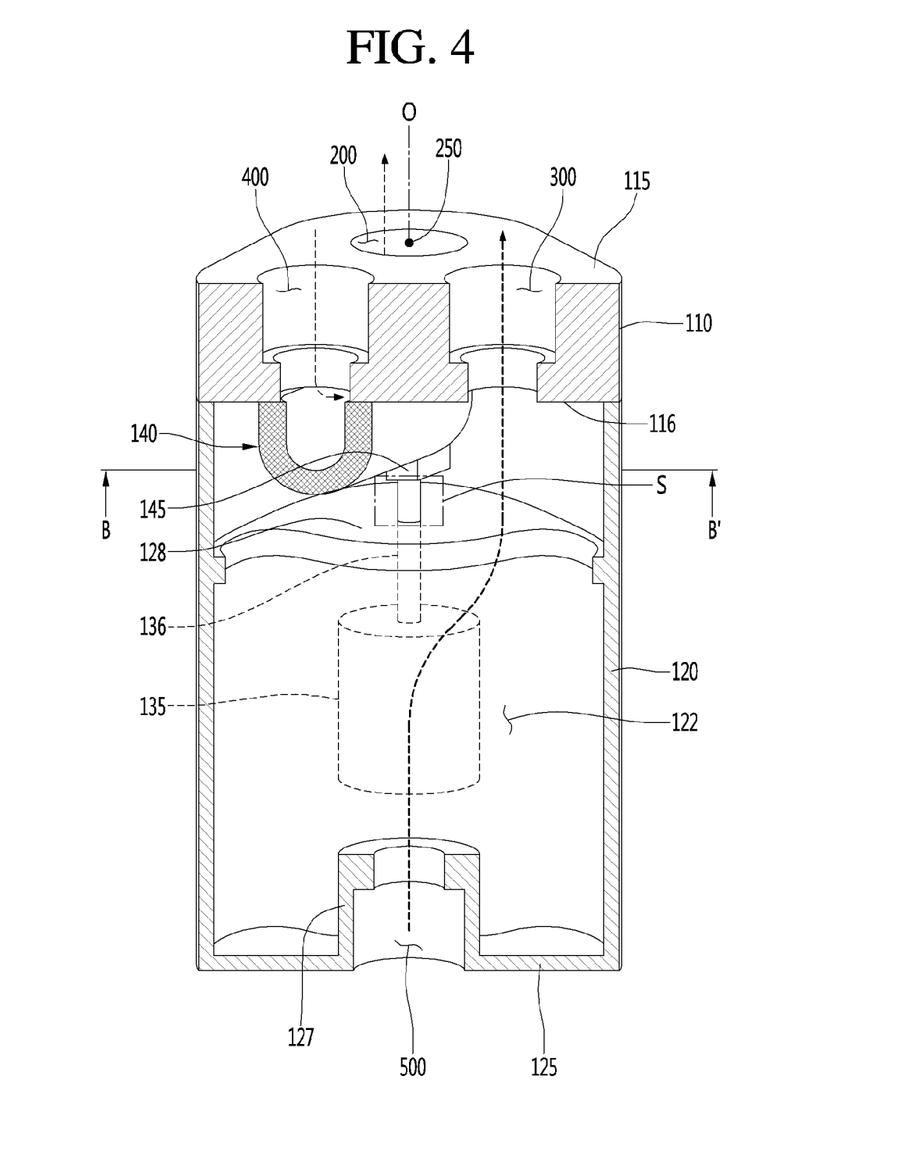
FIG. 4 is a cross-sectional view taken along line A-A' of FIG. 2.

FIG. 2 is a top perspective view of A four-way valve according to an embodiment of the present disclosure, FIG. 3 is a bottom perspective view of a four-way valve according to an embodiment of the present disclosure, and FIG. 4 is a cross-sectional view taken along line A-A' of FIG. 2.

Referring to FIGS. 2 to 4, the four-way valve 100 according to an embodiment of the present disclosure may include a first housing 110 and a second housing 120 is coupled to the bottom of the first housing 110.

The first housing 110 and the second housing 120 may be integrally formed. The first housing 110 and the second housing 120 may be referred to as a "housing."

Pipes 13, 43, and 53 connected to the first heat exchanger, the second heat exchanger 40, and the accumulator 50 may be coupled to an upper surface 115 of the housing 110 or 120.

A pipe 3 connected to the compressor 1 may be coupled to a bottom surface 125 of the housing 110 or 120.

That is, the high pressure pipe 3 may be coupled to the four-way valve 100 on a surface opposite to the coupling surface of the first pipe 13, the second pipe 43, and the low pressure pipe 53.

The first housing 110 may have a plurality of holes opened to allow the refrigerant to flow in an up-down direction. One of the first pipe 13, the second pipe 43, and the low pressure pipe 53 may be connected to the plurality of holes, respectively.

Specifically, the first housing 110 may include a low pressure pipe hole 200 coupled to the low pressure pipe 53, a first pipe hole 300 coupled to the first pipe 13, and a second pipe hole 400 coupled to the second pipe 43.

The low pressure pipe hole 200, the first pipe hole 300, and the second pipe hole 400 may form holes penetrating the first housing from the upper surface 115 of the first housing to a lower surface 116 of the first housing.

The low pressure pipe hole 200, the first pipe hole 300, and the second pipe hole 400 may communicate with an internal space 122 of the second housing 120. Here, the internal space 122 of the second housing 120 may be referred to as a "refrigerant filling chamber."

The first housing 110 may have a triangular pillar shape. The low pressure pipe hole 200, the first pipe hole 300, and the second pipe hole 400 may be arranged such that middle points thereof form a vertex of a triangle.

Here, the middle point of the low pressure pipe hole 200 may be referred to as a reference point 250. For example, the middle point of the first pipe hole 300 may be positioned to be spaced apart in one diagonal direction of the reference point 250, and the middle point of the second pipe hole 400 may be positioned to be spaced apart in the other diagonal direction of the reference point 250.

In addition, the reference point 250 is positioned on a central axis O line of the low pressure pipe hole 200.

A coupling point at which the motor shaft 136 and the shaft coupling portion 140 (to be described later) are coupled is positioned on the central axis O line. For example, the motor shaft 136 may extend along the central axis line O and may be coupled to the shaft coupling part 140. Accordingly, the switching guide 140 (to be described later) may be rotated to contact the first pipe hole 300 or the second pipe hole 400 at a minimum rotation angle.

The second housing 120 may be positioned below the first housing 110. Specifically, the second housing 120 may extend downward along a lower outer circumference of the first housing 110.

The second housing 120 may have the refrigerant filling chamber 122 formed therein. The refrigerant filling chamber 122 may be understood as an internal space of the second housing 120.

That is, the second housing 120 may have a hollow shape so that the refrigerant filling chamber 122 is formed therein. For example, the second housing 120 may be formed to have an shape to have the refrigerant filling chamber 122.

The second housing 120 may include a high pressure pipe hole 500 to which the high pressure pipe 3 is coupled.

Specifically, the high pressure pipe hole 500 may be formed on the bottom surface 125 of the second housing 120. For example, the high pressure pipe hole 500 may form a hole opened in the up-down direction at the center of the bottom surface 125.

The second housing 120 may further include a central end portion 127 defining the high pressure pipe hole 500 and guiding coupling of the high pressure pipe 3.

The central end portion 127 may be formed such that a high-pressure pipe hole 500 having a certain diameter extends upwardly from the center of the bottom surface 125 of the second housing. For example, the central end portion 127 may extend upward along a circumference of the high pressure pipe hole 500 formed at the center of the bottom surface 125. The high pressure pipe 3 may be inserted and coupled into the central end portion 127.

Therefore, the high pressure refrigerant flowing through the high pressure pipe 3 may flow into the four-way valve 100 through the high pressure pipe hole 500. Accordingly, the four-way valve 100 forms a flow path having a straight shape (linear shape) in which the high pressure refrigerant flowing from the bottom surface 125 of the housing is discharged to the upper surface 115 of the housing, whereby problems such as heat transfer, pressure loss, and flow loss caused by a U-shaped flow path of the four-way valve of the related art may be solved.

In addition, the four-way valve 100 has one hole formed on the bottom surface 125 of the housing and three holes formed on the upper surface 115 of the housing, thus reducing a diameter of the four-way valve 100 as compared with a case where all the holes are formed on the upper surface of the four-way valve of the related art. In this case, a miniaturized four-way valve which is suitable for or which can be installed in a narrow width of an engine room of the electric vehicle may be advantageously provided.

Meanwhile, the second housing 120 may include a partition plate 128 extending inward and bent at one point spaced apart downward from a lower end of the first housing. Here, the one point may be defined as an arc.

The partition plate 128 may be provided to spatially partition the refrigerant filling chamber 122 and a motor housing 130.

Specifically, the partition plate 128 may be positioned to be spaced apart from a lower surface 116 of the first housing by a predetermined distance.

In addition, the partition plate 128 may be positioned to be spaced apart from the bottom surface 125 of the second housing upward by a predetermined distance.

The partition plate 128 may be formed to bend an outer surface of the second housing 120 extending downward so as to be perpendicular to an inner side.

The motor shaft 136 described above may extend upward to penetrate through the partition plate 128 along the central axis O. Therefore, the partition plate 125 may be spaced apart vertically downward from a middle point of the low pressure pipe hole 200. Therefore, the partition plate 128 may form a bent surface on the outer circumferential surface of the second housing 120.

In addition, the outer circumferential surface of the second housing 120 may have a depressed surface depressed from the end of the bent surface (or partition plate) and extending downward.

The depressed surface and the lower surface of the partition plate 128 may be coupled to the motor housing 130 (to be described later).

That is, the four-way valve 100 may further include the motor housing 130 having a motor 135.

The motor housing 130 may extend downward from a lower surface of the partition plate 125. The motor housing 130 may be coupled to the depressed surface formed on the outer circumferential surface of the second housing 120. Therefore, the motor housing 130 may be spatially partitioned from the refrigerant filling chamber 122.

The motor housing 130 may be provided with the motor 135. The motor 135 may provide power for rotating the switching guide 140 (to be described later).

The motor 135 may include a step motor in which a rotor rotates at a specific angle or step with the motor shaft 136.

The motor shaft 136 may be provided as a component of the motor 135. The motor shaft 136 may be understood as a rotary shaft extending upward.

The motor shaft 136 may transmit power of the motor 135 to the switching guide 140 (to be described later).

Specifically, the motor shaft 136 may extend upward through the partition plate 128 and may be coupled to a shaft coupling portion 145 of the switching guide 140 installed on the lower surface 116 of the first housing.

The four-way valve 100 may further include the switching guide 140 for selectively changing a flow path of the refrigerant flowing thereinto.

The switching guide 140 may be disposed at the refrigerant filling chamber 122. The switching guide 140 may be installed to be in contact with the lower surface 116 of the first housing 110.

Specifically, the switching guide 140 may be in contact with the lower surface 116 of the first housing to cover a lower end of the low pressure pipe hole 200, a lower end of the first pipe hole 300, or a lower end of the second pipe hole 400. That is, an upper end of the switching guide 140 may be in close contact with the lower surface 116 of the first housing 110.

Accordingly, the low pressure refrigerant flowing in through the first pipe hole 300 or the second pipe hole 400 may be discharged to the low pressure pipe hole 200 and flow to the accumulator 50, without being liked to the refrigerant filling chamber 122. In addition, the high pressure refrigerant flowing into the refrigerant filling chamber 122 through the high pressure pipe hole 500 may be discharged from the first pipe hole 300 or the second pipe hole 400 spatially separated from a flow path allowed to communicate by the switching guide 140.

The switching guide 140 may be formed such that one surface thereof facing the lower surface 116 of the first housing 110 is opened. An inner circumferential surface of the switching guide 140 may be formed as a curved surface depressed downward. For example, the switching guide 140 may have a hemispherical shape or a cylindrical shape cut in a longer direction.

The inner circumferential surface of the switching guide 140 may guide the refrigerant flowing in through one of the first pipe hole 300 and the second pipe hole 400 to flow to the low pressure pipe hole 200.

The switching guide 140 may rotate to the first pipe hole 300 or the second pipe hole 400 with respect to the low pressure pipe hole 200. That is, the switching guide 140 may always communicate with the low pressure pipe hole 200.

The switching guide 140 may rotate to allow two of three holes formed in the first housing 110 to communicate with each other.

For example, when the switching guide 140 is disposed to allow the low pressure pipe hole 200 and the first pipe hole 300 to communicate with each other, the refrigerant introduced through the first pipe hole 300 may be switched in a flow direction along the curved surface and flow to the low pressure pipe hole 200. Here, the high pressure refrigerant flowing into the refrigerant filling chamber 122 through the high pressure pipe hole 500 may flow to the second pipe 43 through the second pipe hole 400.

The switching guide 140 may be rotated by power provided from the motor 135. The switching guide 140 may include the shaft coupling portion 145 to which the motor shaft 136 is coupled.

The shaft coupling portion 145 may be formed on a bottom surface of the switching guide 140. The shaft coupling portion 145 may extend downward from the bottom surface of the shaft coupling portion 145 such that a coupling point of the motor shaft 136 is positioned on the central axis O line.

Therefore, the switching guide 140 that rotates based on the low pressure pipe hole 200 may have a minimum rotation angle, and accordingly, the motor 135 may provide relatively small power to the switching guide 140. As a result, since a size of the motor 135 may be reduced to be relatively small, a size of the four-way valve 100 may be reduced.

The four-way valve 100 may further include a reduction gear (not shown) and a sealing member (not shown) disposed between the motor 135 and the switching guide 140 and varying a driving torque transferred from the motor 135.

The reduction gear (not shown) may be provided as a gear train including a plurality of gears. For example, the reduction gear may be installed in an area S between the shaft coupling portion 145 and the partition plate 128.

The partition plate 128 may serve to spatially partition the refrigerant filling chamber 122 and the motor housing 130. In addition, the driving shaft 136 of the motor 135 may pass through the partition plate 128 upward.

An upper surface of the partition plate 128 may be provided with the sealing member (not shown) for hermetically sealing the motor shaft 136 and the reduction gear.

Specifically, the sealing member may be positioned in the area S formed between the upper surface of the partition plate 128 and a lower surface of the shaft coupling portion 145.

Accordingly, the motor shaft 136 may be not be affected by the high pressure refrigerant flowing from the high pressure pipe hole 500 formed on the bottom surface 125 of the second housing to the first pipe hole 300 or the second pipe hole 400.

Hereinafter, a flow path of the high pressure refrigerant and the low pressure refrigerant will be described briefly.

During cooling, the switching guide 140 may be rotated to allow the low pressure pipe hole 200 and the second pipe hole 400 to communicate with each other.

The high pressure refrigerant flowing into the refrigerant filling chamber 122 through the high pressure pipe hole 500 may flow to the first pipe 13 through the first pipe hole 300 (See the thick dotted arrow in FIG. 4).

The refrigerant of the first pipe 13 may be heat-exchanged and condensed in the first heat exchanger 20, expanded through the expansion valve 30, and then flow into the second heat exchanger 40. The refrigerant flowing into the second heat exchanger 40 may be heat-exchanged and evaporated, and indoor cooling may be performed in the heat exchange process.

Thereafter, the evaporated refrigerant may flow into the second pipe hole 300 through the second pipe 43 and flow to the low pressure pipe hole 200 along the inner circumferential surface of the switching guide 140. may be. In addition, the refrigerant flowing into the low pressure pipe 53 through the low pressure pipe hole 200 may flow into the accumulator 50 and then be recovered by the compressor 1.

Meanwhile, during heating, the switching guide 140 is rotated to allow the low pressure pipe hole 200 and the first pipe hole 300 to communicate with each other.

Then, the high pressure refrigerant flowing into the refrigerant filling chamber 122 through the high pressure pipe hole 500 may flow into the second pipe 43 through the second pipe hole 400. The refrigerant of the second pipe 43 may be heat-exchanged and condensed in the second heat exchanger 40 and may perform indoor heating in the heat exchange process.

Thereafter, the refrigerant evaporated while passing through the first heat exchanger 20 flows into the first pipe hole 300 through the first pipe 13 and flow to the low pressure pipe hole 200 along the inner circumferential surface of the switching guide 140.

As described above, the high-pressure refrigerant flowing into the refrigerant filling chamber 122 through the bottom surface 125 of the four-way valve 100 may flow to the heat exchanger through the upper surface 115 of the four-way valve 100 along the flow path formed as a straight line, unlike the related art. Accordingly, the problems of heat transfer the refrigerant, pressure loss, and flow loss in the four-way valve of the related art described above may be solved.

Figure 5:
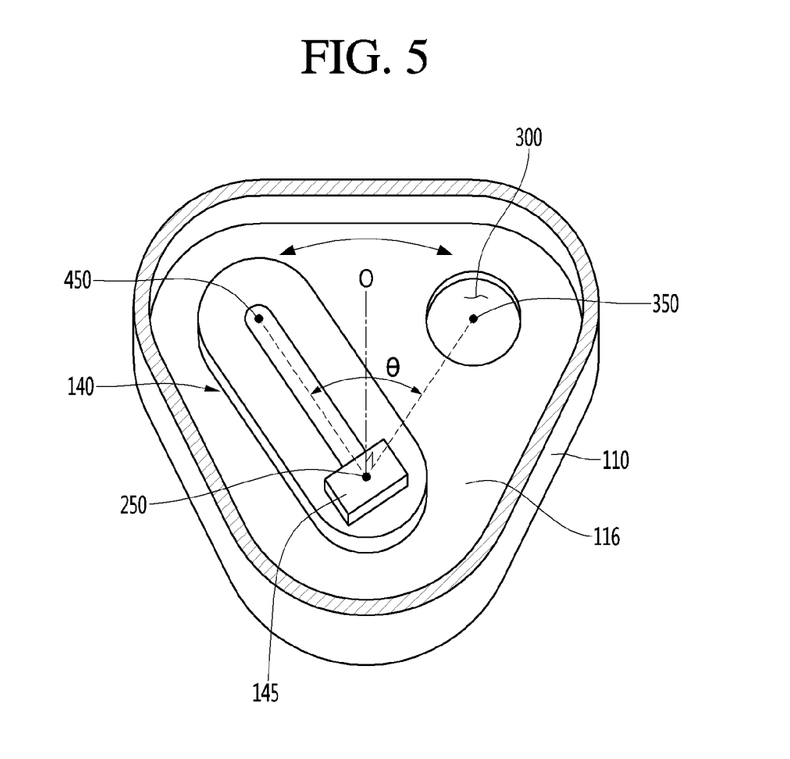
FIG. 5 is a cross-sectional view of a four-way valve in a direction of B-B' of FIG. 4.

FIG. 5 is a cross-sectional view of a four-way valve in a direction of B-B' of FIG. 4.

Referring to FIG. 5, the switching guide 140 may rotate to be in contact with the first pipe hole 300 or the second pipe hole 400 with respect to the reference point 250.

Also, as described above, the coupling point to which the motor shaft 136 and the shaft coupling portion 140 are coupled is positioned on the central axis (O) line. The motor shaft 136 may extend along the central axis O line.

That is, the center point of the shaft coupling portion 140 may be understood as the reference point 250 positioned on the central axis (O) line.

Accordingly, the partition plate 128 may be positioned below the shaft coupling portion 140 and the motor 135 may be positioned below the partition plate 128 along the central axis (O) line.

Therefore, a structure that may minimize interference in the flow path of the high-pressure refrigerant flowing through the refrigerant filling chamber 122 may be provided.

In addition, since the motor 135 is disposed below the partition plate 128, a diameter of the four-way valve 100 may be reduced.

The switching guide 140 may rotate between the middle point 350 of the first pipe hole and the middle point 450 of the second pipe hole. That is, an angle between the middle point 350 of the first pipe hole and the middle point 450 of the second pipe hole is equal to a rotation angle θ of the switching guide 140.

Therefore, the switching guide 140 may rotate by a half of the rotation angle θ in a clockwise or counterclockwise direction with respect to the low pressure pipe hole 200 by power transferred from the motor shaft 135.

Here, the middle point 350 of the first pipe hole and the middle point 450 of the second pipe hole may be positioned to be spaced apart from each other by the same distance with respect to the switching guide 140.

The reference point 250, the middle point 350 of the first pipe hole, and the middle point 450 of the second pipe hole may be positioned at the vertices of the triangle. For example, the low pressure pipe hole 200, the first pipe hole 300, and the second pipe hole 400 may form an equilateral triangle.

Accordingly, the switching guide 140 may rotate by the included angle of the triangle connecting the middle points of the three holes 200, 300, and 400 formed at the first housing 100 to allow the two holes to communicate with each other. That is, power provided from the motor 135 may be reduced to be smaller than power provided to allow two of four holes formed on one surface of the housing of the related art to communicate with each other. Therefore, the motor 135 having relatively small power may be provided, whereby the size of the four-way valve may be reduced.

It will be apparent to those skilled in the art that various modifications and variations may be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A four-way valve comprising:
   a housing having a refrigerant filling chamber formed therein;
   a high pressure pipe hole formed on a bottom surface of the housing and configured to couple to a high pressure pipe through which refrigerant discharged from a compressor is allowed to flow;
   a first pipe hole formed on an upper surface of the housing and configured to couple to a first pipe that extends to a first heat exchanger;
   a second pipe hole formed on the upper surface of the housing and configured to couple to a second pipe that extends to a second heat exchanger;
   a low pressure pipe hole formed on the upper surface of the housing and configured to couple to a low pressure pipe through which the refrigerant to be collected to the compressor is allowed to flow; and
   a switching guide configured to rotate to allow the low pressure pipe hole to selectively communicate with the first pipe hole or the second pipe hole,
   wherein the switching guide is configured to form a curved inner circumferential surface that covers a lower end of the low pressure pipe hole and selectively covers a lower end of the first pipe hole or a lower end of the second pipe hole.

2. The four-way valve of claim 1, wherein
   the refrigerant filling chamber is configured to receive the refrigerant discharged from the compressor; and
   the first pipe hole, and the second pipe hole selectively communicate with the refrigerant filling chamber.

3. The four-way valve of claim 1, wherein
   the housing comprises:
   a first housing;
   a second housing extending downward from a lower end of the first housing; and
   a motor housing coupled to an outer side of the second housing.

4. The four-way valve of claim 3, wherein
   the first housing has a shape of a triangular prism.

5. The four-way valve of claim 3, wherein
   the high pressure pipe hole is configured to open the second housing in an up-down direction.

6. The four-way valve of claim 5, wherein
   the high pressure hole is provided on a bottom surface of the second housing.

7. The four-way valve of claim 3, wherein
   the first pipe hole, the second pipe hole, and the low pressure pipe hole are configured to open the first housing in an up-down direction.

8. The four-way valve of claim 3, wherein
   the second housing comprises a partition to partition the motor housing and the refrigerant filling chamber.

9. The four-way valve of claim 8, wherein
   the motor housing comprises:
   a motor; and
   a motor shaft configured to transfer power from the motor.

10. The four-way valve of claim 9, wherein
    the motor shaft extends upward through the partition plate.

11. The four-way valve of claim 3, wherein
    the motor housing comprises a motor and a motor shaft configured to transfer power from the motor, and
    the switching guide comprises a shaft coupling portion positioned on a central axis line of the low pressure pipe hole and coupled to the motor shaft.

12. The four-way valve of claim 1, wherein
    the switching guide extends perpendicularly to a central axis of the low pressure pipe hole.

13. The four-way valve of claim 1, wherein
    the first pipe hole, the second pipe hole, and the low pressure pipe hole are arranged such that central points thereof form vertices of a triangle.

14. The four-way valve of claim 1, wherein
    the switching guide rotates in a clockwise or counterclockwise direction with respect to the low pressure pipe hole.

15. An electric vehicle comprising:
    a battery; and
    an air conditioner using the battery as a driving source,
    wherein the air conditioner comprises a compressor, a first heat exchanger, a second heat exchanger, and a four-way valve through which a refrigerant circulates,
    wherein the four-way valve comprises:
    a housing having a refrigerant filling chamber formed therein;
    a high pressure pipe hole formed on a bottom surface of the housing and coupled to a high pressure pipe through which the refrigerant discharged from the compressor is allowed to flow;
    a first pipe hole formed on an upper surface of the housing and coupled to a first pipe extending to a first heat exchanger;
    a second pipe hole formed on the upper surface of the housing and coupled to a second pipe extending to a second heat exchanger;
    a low pressure pipe hole formed on the upper surface of the housing and coupled to a low pressure pipe through which the refrigerant to be collected to the compressor is allowed to flow; and a switching guide configured to rotate to allow the low pressure pipe hole to selectively communicate with the first pipe hole or the second pipe hole,
wherein the switching guide is configured to form a curved inner circumferential surface that covers a lower end of the low pressure pipe hole and selectively covers a lower end of the first pipe hole or a lower end of the second pipe hole.

16. The electric vehicle of claim 15, wherein
the air conditioner is installed in an engine room.

17. The electric vehicle of claim 15, wherein
the second heat exchanger is installed in an indoor duct.

18. The electric vehicle of claim 17, wherein
the indoor duct is equipped with a PTC heater and a blow fan.

19. The electric vehicle of claim 15, wherein
the switching guide extends perpendicularly to a central axis of the low pressure pipe hole.

\* \* \* \* \*